UNITED STATES PATENT OFFICE.

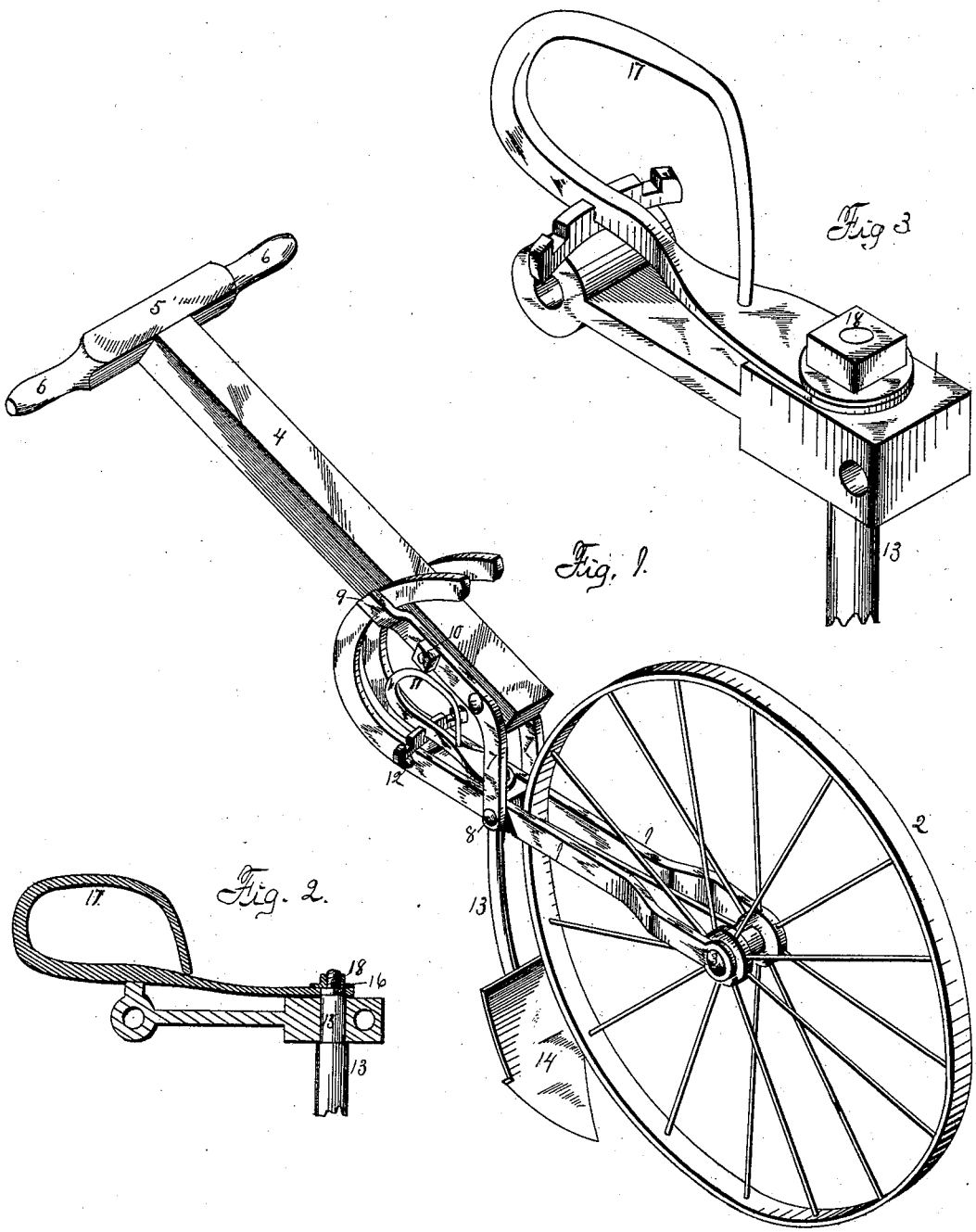

HORACE G. EMERSON, OF ROCKFORD, ILLINOIS, ASSIGNOR TO HENRY H. PALMER AND SAMUEL D. PALMER, OF SAME PLACE.

CULTIVATOR.

SPECIFICATION forming part of Letters Patent No. 400,837, dated April 2, 1889.

Application filed May 26, 1888. Serial No. 275,132. (No model.)

*To all whom it may concern:*

Be it known that I, HORACE G. EMERSON, a citizen of the United States, residing at Rockford, in the county of Winnebago and State of Illinois, have invented certain new and useful Improvements in Cultivators, of which the following is a specification.

This invention relates to a class of cultivators known as the "garden-cultivator," which is operated by hand, and is designed more particularly for use in cultivating small garden vegetables.

The object of this invention is to construct a garden-cultivator in which the shovel is made adjustable to throw the earth to or from the plants, and the handle made vertically adjustable to suit the operator. To this end I have designed and constructed the cultivator represented in the accompanying drawings, in which—

Figure 1 is an isometrical representation of a garden-cultivator illustrating my improvements. Fig. 2 is a lengthwise vertical section showing the connection of the shovel-standard. Fig. 3 is an isometrical representation of the support between the side bars, showing the toothed segment and the shovel-standard connected therewith.

My improved cultivator consists of side bars, 1, curved upward at their rear ends in segment form. Between the front ends of these side bars is supported a carrying-wheel, 2, which is held in place by a bolt, 3, passing through the bars and hub of the wheel to revolve in its connection with the side bars. A handle, 4, of bar form, has at its free end a cross-bar, 5, fitted with handle projections 6, by means of which the cultivator is operated. The forward end of the handle 4 is pivotally connected to the side bars 1 by means of side bars 7, secured to the handle on opposite sides and connected to the side bars 1 by a bolt, 8, passing through the parts. The rear ends of the bars 7 are bent in the form shown at 9 to overspan the segmental portion of the side bars 1, and by means of a bolt, 10, passing through the bars and handle, serve to clamp and hold the handle firmly to the side bars 1, and by reason of the pivoted connection of the handle with the side bars 1 the handle may be adjusted to vary the working-height of the handle.

A shovel-carrying support is clearly shown in Fig. 3, and is held in position between the side bars 1 by bolts 8 and 12 passing through the parts. The forward end of the support is bored vertically to receive a shovel-standard, 13. The rear end of the support is produced in segment-ratchet form.

A shovel-standard, 13, has a shovel, 14, of any suitable construction, secured to its lower end. The upper end portion, 15, of the shovel-standard 13 is of cylindrical form in cross-section, and is supported in the opening in the support. The portion 16 immediately above its socket-support is produced in rectangular form in section to receive an adjusting-handle, 17, placed upon the rectangular portion of the standard, and the upper end is screw-threaded, and a screw-nut, 18, placed on the screw-threaded end of the standard, serves to fix the standard in its support. The rear end of the handle 17 is produced in loop-handle form, and its under face is fitted to engage the teeth in the segment-ratchet and in its adjustments serves to adjust the inclination of the shovel laterally to throw the earth to or from the plants and hold it in the adjusted position. By this construction of a garden-cultivator the running depth is regulated by raising or lowering the handle 4, and the handle made vertically adjustable to meet the requirements of the user, also the shovel made laterally adjustable to vary the inclination of the shovel relatively with the line of draft.

I claim as my invention—

1. In a garden-cultivator, the combination, with a carrying-wheel, a handle, side bars connecting the wheel and the handle, and a support bolted between said side bars, of a shovel-standard journaled in said support near one end, a segment-ratchet secured to the support near its opposite end, and a handle connecting the standard and segment-ratchet so as to adjust the shovel, substantially as set forth.

2. In a garden-cultivator, the combination, with a handle and supporting-wheel, side bars connecting the handle and supporting-wheel, and provided with curved inner ends, of bars rigidly secured to the said handle and pivoted with their outer ends to the intermediate portions of said side bars, and provided at their opposite ends with overlapping portions which frictionally engage the curved ends of the side bars, substantially as set forth.

3. In a garden-cultivator, the combination, with a handle, and side bars connecting the handle and supporting-wheel, of bars pivotally connecting the handle with the side bars, and having their ends formed to embrace and adjust the handle upon the upturned ends of the side bars, substantially as set forth.

HORACE G. EMERSON.

Witnesses:
A. O. BEHEL,
E. BEHEL.